United States Patent Office 3,278,612
Patented Oct. 11, 1966

3,278,612
OXO PROCESS USING COBALT CARBONYL AND TERTIARY PHOSPHINE UNDER BASIC CONDITIONS
Charles R. Greene, Berkeley, Calif., assignor to Shell Oil Company, New York, N.Y., a corporation of Delaware
No Drawing. Filed Jan. 23, 1962, Ser. No. 168,240
11 Claims. (Cl. 260—632)

The present invention relates to an improved process for the production of alcohols from organic compounds having a less number of carbon atoms in the chain. More particularly, it relates to the production of $C_{n+1}$ and $C_{2(n+1)}$ alcohols from $C_n$ olefins, such as butanol and 2-ethylhexanol simultaneously from propylene. The invention deals with the catalytic synthesis of alcohols in the presence of certain complex hydroformylation/hydrogenation catalysts in a particular reaction medium.

Processes for the production of aldehydes and alcohols from unsaturated hydrocarbons are well known. In particular, the so-called oxo process is widely used commercially for the production of oxygenated organic compounds, particularly aldehydes and alcohols. Moreover, recent developments have led to novel oxonation catalysts comprising transition metal complexes with carbon monoxide and other ligands such as, for example, electron-donating trivalent phosphorus compounds, especially trihydrocarbon phosphorus, e.g., trialkyl phosphines. In accordance with these recent developments, it is now possible, for example, to hydroformylate propylene directly to butyl alcohol by reacting the propylene with hydrogen and carbon monoxide in the presence of these novel catalysts, and even at much lower carbon monoxide partial pressures than heretofore feasible. Such procedures represent a marked advance over the conventional oxo catalysts and processes and enable the economic production of valuable alcohols and other related products, particularly in view of the requirement for only moderately superatmospheric pressures during reaction.

In the conventional oxo process the active catalystic ingredient in the hydroformylation reaction has been considered as $HCo(CO_4)$, cobalt hydrocarbonyl, an acid. Experiments heretofore have indicated that the hydrogen portion of such active ingredient should be present in order to assure adequate catalytic activity. Accordingly, while advantages of operating the conventional oxo process under conditions other than in an acid or hydrogen-available system may have been considered, no satisfactory process under such conditions has been developed. When the reaction system with the conventional cobalt carbonyl catalyst is brought to the alkaline side, the activity of the catalyst markedly diminishes and desired product formation practically ceases.

Now, in accordance with the present invention, it has been found that complex transition metal-phosphorus compound catalytically active materials such as those aforementioned are useful for oxonation and hydrogenation in alkaline systems, particularly in systems which contain organic Lewis bases, i.e., electron-sharing donors such as amines. Certain important advantages are attendant thereto. Moreover, as will be pointed out in greater detail hereinafter, product distribution may often be controlled in hydroformylation reactions using the novel complex transition metal catalysts by simply varying the basicity of the reaction system. This can be accomplished by a judicious inclusion into the system of basic media having different degrees of alkalinity.

In conducting conventional hydroformylation or oxo processes in a hydrogen-available medium, undesirable materials such as acetals, as for example, dibutyl butyral, are generally formed and not only hinder the reaction but needlessly waste valuable feed materials which could be more advantageously and desirably converted to useful products.

The invention, therefore, in its broadest aspects, contemplates the use of alkaline processing conditions in conjunction with the specialized catalysts already mentioned and thereby eliminating the production of undesired contaminants as well as producing certain specific and highly desirable products by means of what, in effect, amounts to a single-step process. For example, under proper conditions, the valuable 2-ethylhexanol, an important $C_8$ alcohol, can be readily manufactured by a single combined hydroformylation-condensation-hydrogenation step directly from propylene. The same catalyst and conditions convert butyraldehyde to 2-ethylhexanol.

In accordance with a preferred embodiment of the invention, which is set forth herein for purposes of illustration, propylene, hydrogen, and carbon monoxide are reacted in diphenyl ether containing about 25% $C_{12}$ to $C_{15}$ highly branched primary amine in the presence of a complex transition metal catalyst, in this particular instance, a cobalt carbonyl tri-n-butyl phosphine which may be represented by the empirical formula $[Co(CO)_3PBu_3]_2$, to form preponderant amounts of 2-ethylhexanol accompanied by the production of large amounts of butanol; the latter being principally normal butanol. Whereas use of the same complex transition metal catalyst without the addition of base yields normal butanol as the anticipated product, it has now been discovered that by making the system basic an approximately 50:50 mixture of $C_4:C_8$ oxygenated organic product is formed. Moreover, under special conditions to be described in greater detail hereinafter, as much as at least 85% 2-ethylhexanol is formed directly from propylene.

While the reaction proceeds to all practical purposes as a single-step process in a unitary reaction zone, the exact mechanism whereby the $C_8$ alcohol is formed is not known with certainty but is believed to be via the initial formation of n-butyraldehyde, aldol condensation of the n-butyraldehyde, dehydration to unsaturated $C_8$ aldehyde, and hydrogenation through the catalytic action of the complex catalyst to the final product. In any event, the entire process is effected rapidly and with considerable facility with respect to eventual product distribution control. Moreover, as has been already suggested, the reaction proceeds in an alkaline medium without the formation of undesired acetals and other relatively commercially unimportant and disadvantageous contaminants.

While, for purposes of example and to better explain the invention with sufficient clarity to enable those skilled in the art to practice it, cobalt carbonyl tri-n-butyl phosphine has been described as an especially useful catalyst, other complex transition metal catalysts suitable for the hydroformylation of materials containing olefinic linkages may also be used in the process of the present invention. A preferred class of such catalyst are cobalt carbonyl phosphines in which the phosphines are trihydrocarbon phosphines, $R_3P$, where the R's are independently selected from aliphatic (acylic or alicyclic) and aromatic hydrocarbon radicals containing up to 18 carbon atoms per radical with a total of up to 30 carbon atoms in the phosphine. Transition metals other than cobalt, particularly rhodium and ruthenium, may also be employed. Representative suitable phosphines useful as catalysts are:

(1) Triacyclic aliphatic such as as triethyl phosphine, tri-n-butyl phosphine, tri-n-hexyl phosphine, tridecyl phosphine, di-n-butyl octadecyl phosphine.

(2) Trialicyclic aliphatic (cycloalkyl) such as tricyclohexyl phosphine, tricyclopentyl phosphine, and trimethyl cyclopentyl phosphine.

Now, in accordance with the invention, the basicity of the reaction system is adjusted to varying degrees of alkalinity depending upon, for the most part, the product distribution desired. Various basic materials compatible with the system and non-reactive therewith in deleterious manner are useful. Inorganic basic compounds such as alkali and alkaline earth metal oxides, hydroxides, and salts of weak acids, such as potassium hydroxide in particular, as well as various organic materials having base groupings, as primary, secondary, or tertiary amines and the like are particularly useful. Amines constitute a particularly advantageous class and, depending upon the strength and basicity of the particular amine employed, even in and of itself or in admixture with some other basic material such as another amine having a different basicity, the particular products formed may be advantageously controlled. As a general rule, as the basicity of the reaction system is increased, as by appropriate inclusion of required amounts of basic materials, the amount of the higher alcohols markedly increases, with the other reaction products being largely lower alcohols.

Potassium hydroxide and amines, and especially unsubstituted amines, represent a preferred class of bases useful for accomplishing the objectives of this invention. The primary amines are especially useful, particularly the saturated aliphatic primary amines. They may contain from 1 to 30 carbon atoms, preferably 3 to 20 carbon atoms. Although the aliphatic groups may be acyclic or alicyclic, the non-straight-chain alkyl (acyclic or alicyclic) are preferred, and especially the secondary and tertiary branched alkyl groups. The highly branched tertiary alkyl primary amines of 12 to 18 carbon atoms such as those obtained by the reaction of ammonia with olefin polymers such as propylene tetramer, isobutylene trimer, propylene pentamer, isobutylene tetramer and propylene hexamer are especially useful moderators for the system; they are also stable and high-boiling and the $C_8$-alcohol products are distillable therefrom leaving the amine in the distillation bottoms where they also tend to stabilize the catalyst. Tetrahydroabietylamine is also a useful, high-boiling amine.

Secondary and tertiary amines of 1 to 30 carbon atoms, especially 3 to 20 carbon atoms, are useful. They may be acyclic or alicyclic aliphatic amines or heterocyclic amines such as pyrrole, pyridine, quinoline, isoquinoline or acridine and the corresponding fully hydrogenated derivatives. The high-boiling heterocyclic amines such as quinoline, N-methylquinoline and decahydroquinoline are especially useful in the production of lower boiling alcohols.

In addition to the monoamines, polyamines are also useful, both those containing only primary amine groups such as hexamethylene diamine, decamethylene diamine and the like and those containing primary and/or secondary or tertiary amine groups such as the polyalkylene polyamines, e.g., tetraethylene pentamine, pyrazine, $\alpha,\alpha'$-dipyridyl.

Aromatic amines are also useful, such as aniline, N,N-dimethylaniline, $\alpha$-naphthylamine, and phenylene diamine. The amines can be aralkyl amines such as benzylamine and xylylene diamine and alkarylamines, such as tolyamine and durene diamine.

In addition to the unsubstituted hydrocarbon amines, non-reactive groups may be present. An especially useful such group, which makes it possible to provide compounds with suitable boiling points, are ether oxygen atoms. Thus, amine ethers are peculiarly useful in this invention; they may be aliphatic ethers, acyclic or alicyclic, or aromatic ethers. Representative useful compounds are $\beta,\beta'$-diamino-diethyl ether, 6,6'-diamino dihexyl ether, morpholine, $\rho,\rho'$-diamino diphenyl ether.

The various amines can be used but it is preferable to use one in a given synthesis which has a boiling point of at least about 10° C., preferably 20° C., different from, preferably higher than, the boiling point of the reactants and reaction product(s).

The amine can be used as reaction medium or admixed with another suitable compatible, preferably high-boiling, inert solvent for the catalyst and reaction product(s).

With regard to inorganic basic compounds suitable for use in connection with the process of the present invention, certain basic alkali or alkaline earth metal compounds which are soluble in the system of at least 1% by weight may be used. In addition to materials such as the hydroxides, hydrocarbon monocarboxylate materials especially alkanoates and aromatic carboxylates may be used provided they satisfy the solubility requirements as well as that they provide the desired degree of alkalinity to the system. Such materials as, for example, potassium laurate, sodium laurate, potassium stearate and potassium phenyl dodecanoate may be especially useful, although a preferred embodiment of the invention contemplates the use of even stronger basic substances such as potassium hydroxide in particular. It has been found that when using potassium hydroxide in a concentration of about 5% by weight in the system, the yields of 2-ethyl hexanol are substantially in excess of 80%. It will be appreciated that inorganic materials are substantially less soluble in higher alcohols due to the attendant decrease in polarity of solvent. Accordingly the solubility of such inorganic compounds will depend to a degree on the amount of alcohols such as, for example, $C_{12}$ alcohols, which are produced as by-products in the reaction. However, the process of the present invention contemplates the production of only limited amounts of such $C_{12}$ alcohols preferably not in excess of about 3%. Accordingly, the solubility of inorganic basic compounds is quite acceptable generally in the process and is often to be preferred over the organic amines such as have already been described.

While, for purposes of illustration and description, propylene is suggested herein as a desired feed material for producing butanols without the formation of contaminating high-boiling materials such as acetals, and the like, or, moreover, wherein 2-ethylhexanol is sought, it is also contemplated within the scope of the the invention that from $C_2$ to $C_{12}$ olefins may be hydroformylated and processed in a direct, signle-step process to form corresponding desirable products other than those set forth hereinbefore. Furthermore, aldehydes or ketones, such as, for example, butyraldehyde, are converted by base condensation, such as aldolization and hydrogenation in the presence of the transition metal complex base, and hydrogen into the corresponding higher alcohol, in this case 2-ethylhexanol. The catalysts of this invention are effective for the catalytic hydrogenation of hydroxy alakanals and hydroxyalkanones, alkenals and alkenones to corresponding alkanols. For example, 2-ethyl-3-hydroxy hexenal is converted to 2-ethyl hexanol. Accordingly, as long as the desired degree of alkalinity is maintained in the system to form the particular product sought, either an olefin, an aldehyde or a ketone may constitute the starting material in the substantially 1-step process wherein the higher alcohol is desired.

It is also contemplated that the reaction be controlled under proper processing conditions whereupon still further and higher alcohols may or may not result, depending upon the particular end product desired. The following examples will serve to illustrate with particularity various embodiments and features of advantage of the invention and will specifically point out processing conditions for the formation of the particular products formed therein. It will be appreciated that the pH of the system may vary over relatively wide limits with an important controlling variable being the particular product desired. For instance, it has been found that at a pH of at least 8.8, substantially no acetal formation occurs. The pH control is generally effected by means of varying the composition of the basic material incorporated into the system along with the amounts thereof relative to the other ingredients in the reaction zone. The reaction temperatures may also vary over relatively wide limits, say from 100 to 250° C. for a contact time of 10 to 360 minutes; with a preferred range being from 150 to 190° C. for a contact time of 30 to 120 minutes.

In using the complex transition metal catalysts in conjunction with the processing conditions of the present invention, it must be kept in mind that catalyst stability will determine to some extent the upper temperature limits of the reaction and that in order to effect proper hydroformylation as well as the other reactions which occur in the unitary process, certain pressures must advantageously be maintained. Depending upon other variables and, in particular, upon the temperature of the reaction, the pressure in the system should exceed 100 p.s.i.g. but may vary within the range of from 100 to 1500 p.s.i.g., with a pressure range of from about 400 to 700 p.s.i.g. being preferred.

The over-all amount of basic material to be added to the reaction system may also vary over relatively wide limits, depending principally upon the particular basic materials used as well as upon the product distribution to be achieved. Reference is now made to the following examples of preferred embodiments of the invention which illustrate the relationship of product distribution with the alkalinity of the reaction system, along with specific amounts of reactant and particular processing conditions which have been found through practice to be particularly expedient. However, the invention is not intended to be limited by the exact details as set forth in the examples.

*Example I*

A continuous reaction system was charged with sufficient cobalt carbonyl/butyl phosphine (ratio of cobalt to phosphine=1) catalyst complex in n-butanol solvent to give 1% w. cobalt in the solution. The reaction was carried out at 160° C., 500 p.s.i.g., $H_2/CO$ mole ratio of 1.8 and CO/propylene mole ratio of 1.18. The residence time in the unit was 90 minutes. The over-all conversion of propylene was 95% M. The yield of acetal, dibutyl butyral, was 25% w., and the yield of 2-ethylhexanol was 1% w. The balance of the liquid product was butyraldehyde and butanol with a normal:isobutyl ratio of 9:1. Approximately 9% M of the propylene fed was converted to propane. The catalyst half-life was 40 hours, i.e., one-half the complex carbonyl was decomposed at the end of 40 hours' reaction time.

*Example II*

A continuous reaction was carried out as outlined in Example I with the exception that the solvent contained 15% w. tri-n-butyl amine. The conversion of propylene was again 95% M. The addition of the amine sufficiently stabilized the complex carbonyl catalyst so that the catalyst half-life was in excess of 80 hours. The yield of acetal, dibutyl butyral, was only 4% w. and the yield of 2-ethylhexanol was still 1% w. The balance of the liquid product was butyraldehyde and butanol with a normal:isobutyl product ratio of 9:1 and 90% w. alcohol.

*Example III*

A continuous reaction was carried out as described in Example I except that 15% w. of Rhom and Haas primene JMT, a 20-carbon-atom tertiary alkyl primary amine, was added to the solvent such that its concentration was 15% w. of the solvent. The conversion of propylene was again 95% M. The yield of acetal, dibutyl butyral, was less than 1% w. The yield of 2-ethylhexanol was 57% w. The catalyst half-life was greater than 150 hours.

*Example IV*

A continuous reaction was carried out as described in Example I except that 30% w. tributyl amine was added to the solvent. The conversion of propylene was 93% M. The yield of acetal, dibutyl butyral, was less than 0.7% w. The yield of 2-ethylhexanol was 1% w. The balance of the liquid product was 90% butanol, 10% w. butyraldehyde with a normal:isobutyl ratio of 9:1. The catalyst half-life was in excess of 400 hours.

*Example V*

A continuous reaction was carried out as described in Example I except that 0.5% w. potassium hydroxide was added to the n-butanol solvent. The conversion of propylene was 90% M. The yield of acetal was less than 0.5% w. and the yield of 2-ethylhexanol was 60% w. The remaining liquid product was butyraldehyde and butanol in a 9:1 ratio. The catalyst half-life was greater than 500 hours.

*Example VI*

A continuous reaction was carried out as described in Example I with the exception that 1.5% w. potassium hydroxide was added to the n-butanol solvent and the $H_2/CO$ mole ratio was decreased from 1.8 to 0.9 in order to increase the concentration of butyraldehyde at the steady state. The conversion of propylene was 94% M. The yield of acetal was less than 0.01% w. and the yield of 2-ethylhexanol was 87% w. The balance of the liquid product was butyraldehyde and butanol with a ratio of normal butyl to isobutyl products of 9:1. The catalyst half-life was in excess of 500 hours.

*Example VII*

A batch reaction vessel was charged with 59 grams of catalyst complex of the formula $Co_2(CO)_6 \cdot 2P(butyl)_3$ in 1000 grams of Dowtherm A containing 20% w. of Primene JMT, a 20-carbon-atom teriary alkyl primary amine. To this was added 125 p.s.i.g. of CO, 125 p.s.i.g. propylene, and 250 p.s.i.g. $H_2$ The mixture was heated to 160° C. for 5 hours. At the end of this period, the reaction was complete. Analysis of the product showed a yield of 2-ethyl hexanol of 12% w. The balance of the propylene derived product was butyl alcohol and butyraldehyde in the ratio of 7.3. The ratio of n-butyl to isobutyl products was 5.7. Approximately 9% M of the propylene fed was hydrogenated to propane.

I claim as my invention:

1. The process for the production of unsubstituted aldehydes and alcohols which consists essentially of reacting an unsubstituted olefinic hydrocarbon with carbon monoxide and hydrogen at a temperature of from about 100 to about 250° C., and a pressure of from about 100 to about 1500 pounds, in the presence of (a) a catalyst consisting essentially of a complex of cobalt with carbon monoxide and a tertiary organophosphine and (b) an inorganic basic compound selected from the group consisting of the oxides, hydroxides and carboxylic acid salts of the alkali metals and the alkaline earth metals.

2. The process in accordance with claim 1 wherein said basic alkali metal compound is potassium hydroxide.

3. The process for the production of unsubstituted aldehydes and alcohols which consists essentially of unsubstituted olefinic hydrocarbon with carbon monoxide and hydrogen, at a temperature of from about 100 to about 250° C., and a pressure of from about 100 to about 1500 pounds, in the presence of (a) a catalyst consisting essentially of a complex of cobalt with carbon monoxide and a trihydrocarbylphosphine and (b) potassium hydroxide, thereby reacting said olefinic compound with said carbon monoxide and hydrogen with the formation of aldehydes and alcohols.

4. The process for the direct conversion of unsubstituted olefinic hydrocarbons having $n$ carbon atoms to the moelcule to unsubstituted saturated aliphatic alcohols having $2n+2$ carbon atoms to the molecule, $n$ having a value of 2 to 12, inclusive, which consists essentially of reacting said olefinic hydrocarbon with carbon monoxide and hydrogen at a temperature of from about 100 to about 250° C. and a pressure of from about 100 to about 1500 pounds in the presence of:
(1) a complex catalyst consisting essentially of cobalt in complex combination with carbon monoxide and a tertiary organophosphine, and
(2) an inorganic basic compound selected from the group consisting of the oxides, hydroxides, and carboxylic acid salts of the alkali metals and the alkaline earth metals.

5. The process for the direct conversion was unsubstituted olefinic hydrocarbons having $n$ carbon atoms to the molecule to unsubstituted saturated aliphatic alcohols having $2n+2$ carbon atoms to the molecule, $n$ having a value of 2 to 12, inclusive, which consists essentially of reacting said olefinic hydrocarbon with carbon monoxide and hydrogen at a temperature of from about 100 to about 250° C. and a pressure of from about 100 to about 1500 pounds in the presence of:
(1) a complex catalyst consisting essentially of cobalt in complex combination with carbon monoxide and a teriary organophosphine, and
(2) an alkali metal hydroxide.

6. The process in accordance with claim 5 wherein said alkali metal hydroxide is potassium hydroxide.

7. The process in accordance with claim 5 wherein said complex catalyst consists essentialy of cobalt in complex combination with carbon monoxide and a trihydrocarbylphosphine wherein each of the hydrocarbyl radicals of the trihydrocarbylphosphine have up to 18 carbon atoms.

8. The process for the direct conversion of unsubstituted olefinic hydrocarbons having $n$ carbon atoms to the molecule to unsubstituted saturated aliphatic alcohols having $2n+2$ carbon atoms to the molecule, $n$ having a value of 2 to 12, inclusive, which consists essentially of reacting said olefinic hydrocarbon with carbon monoxide and hydrogen at a temperature of from about about 100 to about 250° C. and a pressure of from about 100 to about 1500 pounds in the presence of: (1) a complex catalyst consisting essentially of cobalt-carbonyl-tributylphosphine and (2) potassium hydroxide.

9. The process in accordance with claim 8 wherein the ratio of potassium hydroxide to cobalt calculated as metal is in the range of from about 1.5:1 to about 5:1.

10. The process for the direct conversion of propylene to 2-ethylhexanol which consists essentially of reacting propylene with carbon monoxide and hydrogen at a temperature of from about 100 to about 250° C. at a pressure of from about 100 to about 1500 pounds in the presence of (1) a catalyst complex consisting essentially of cobalt in complex combination with carbon monoxide and a trihydrocarbylphosphine and (2) an alkali metal hydroxide, and separating 2-ethylhexanol from the resulting reaction mixture.

11. The process for the direct conversion of propylene to 2-ethylhexanol which consists essentially of reacting propylene with carbon monoxide and hydrogen at a temperature of from about 100 to about 250° C. at a pressure of from about 100 to about 1500 pounds in the presence of (1) a catalyst complex consisting essentially of cobalt-carbonyl-tributylphosphine and (2) potassium hydroxide, and separating 2-ethylhexanol from the resulting reaction mixture.

References Cited by the Examiner

UNITED STATES PATENTS

| | | | |
|---|---|---|---|
| 2,497,303 | 2/1950 | Gresham et al. | 260—632 |
| 2,564,130 | 8/1951 | Schreyer | 260—632 |
| 2,731,504 | 1/1956 | Reppe et al. | 260—632 |
| 3,020,314 | 2/1962 | Alderson | 260—632 |
| 3,098,100 | 7/1963 | Aldridge et al. | 260—638 |
| 3,102,899 | 9/1963 | Cannell | 260—632 |
| 3,130,237 | 4/1964 | Wald | 260—632 |

OTHER REFERENCES

Friedli: Uber die Anlagerung von Kohlenoxyd/Wasserstoff an Alcohole, 1959, pp. 13, 14.

Groggins: Unit Processes in Organic Synthesis, 4th ed., 1952, pp. 560–569.

Hieber et al.: Chem. Abst., vol. 54, 1960, column 12087–12089, 2 pages.

LEON ZITVER, *Primary Examiner.*

B. M. EISEN, J. E. EVANS, *Assistant Examiners.*